(12) United States Patent
Choi et al.

(10) Patent No.: US 8,928,258 B2
(45) Date of Patent: Jan. 6, 2015

(54) VIBRATION CONTROL DEVICE AND METHOD

(75) Inventors: Young-joon Choi, Seoul (KR); Yeo-jun Yoon, Suwon-si (KR); Ka-won Cheon, Seoul (KR); Sung-bin Kuk, Suwon-si (KR); Dong-jin Eun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 588 days.

(21) Appl. No.: 13/091,692

(22) Filed: Apr. 21, 2011

(65) Prior Publication Data

US 2011/0260657 A1    Oct. 27, 2011

(30) Foreign Application Priority Data

Apr. 21, 2010 (KR) .................. 10-2010-0037046

(51) Int. Cl.
*H02P 1/00*   (2006.01)
*B06B 1/16*   (2006.01)
*H02P 31/00*  (2006.01)

(52) U.S. Cl.
CPC .............. *H02P 31/00* (2013.01); *B06B 1/162* (2013.01)
USPC ......................................... 318/135; 318/687

(58) Field of Classification Search
USPC .................. 318/135, 114, 119, 687
See application file for complete search history.

(56) References Cited

U.S. PATENT DOCUMENTS

| | | | |
|---|---|---|---|
| 6,351,089 B1 | 2/2002 | Ibuki et al. | |
| 6,424,333 B1 * | 7/2002 | Tremblay et al. | 345/156 |
| 6,429,846 B2 * | 8/2002 | Rosenberg et al. | 345/156 |
| 6,774,588 B2 | 8/2004 | Ibuki et al. | |
| 7,084,854 B1 * | 8/2006 | Moore et al. | 345/157 |
| 7,180,254 B2 | 2/2007 | Klemm et al. | |
| 7,430,439 B2 * | 9/2008 | Griffin et al. | 455/552.1 |
| 2004/0189484 A1 * | 9/2004 | Li | 340/825.19 |
| 2005/0208903 A1 * | 9/2005 | Sakamoto | 455/90.3 |
| 2006/0288137 A1 * | 12/2006 | Grant et al. | 710/62 |
| 2006/0290662 A1 * | 12/2006 | Houston et al. | 345/156 |
| 2009/0280860 A1 * | 11/2009 | Dahlke | 455/556.1 |
| 2012/0068835 A1 * | 3/2012 | Li | 340/407.2 |

FOREIGN PATENT DOCUMENTS

| | | |
|---|---|---|
| JP | 2000-253639 | 9/2000 |
| JP | 2001-016892 | 1/2001 |
| JP | 2002-300795 | 10/2002 |
| JP | 2005-532018 | 10/2005 |

* cited by examiner

*Primary Examiner* — Rina Duda
(74) *Attorney, Agent, or Firm* — The Farrell Law Firm, P.C.

(57) ABSTRACT

A vibration control device and method, wherein the vibration control device includes a first driving unit for vibrating the vibration control device up and down, a second driving unit for moving the vibration control device left or right, and a control unit for controlling the first driving unit and the second driving unit, upon an occurrence of an event. The controller controls the second driving unit to move the vibration control device at a time when the first driving unit vibrates the vibration control device off of a surface.

10 Claims, 17 Drawing Sheets

FIG. 4D
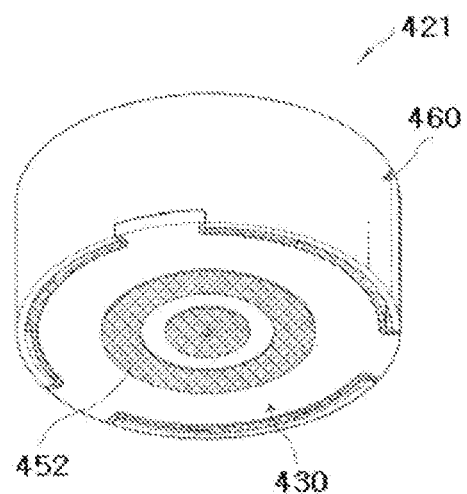
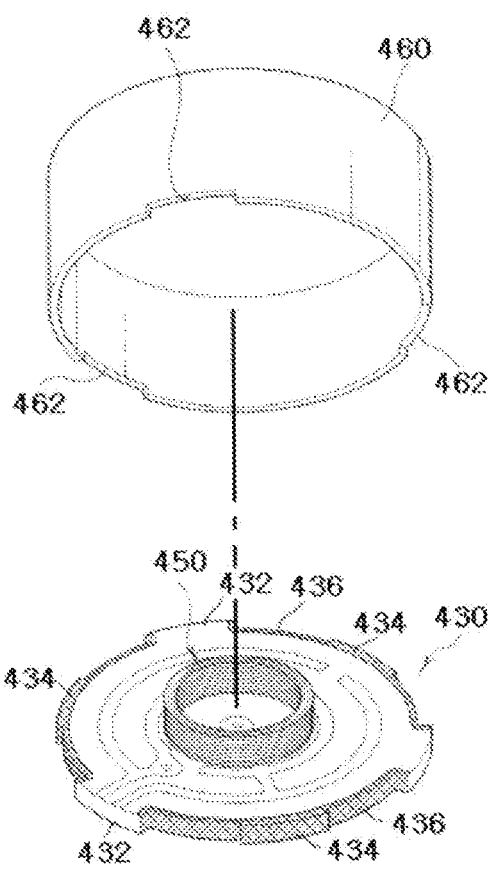

FIG. 13
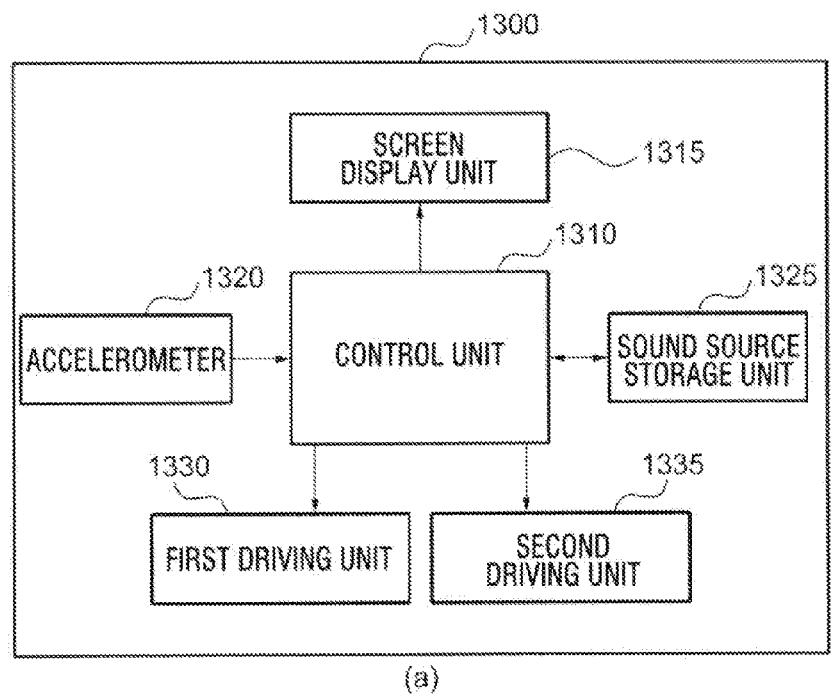
(a)
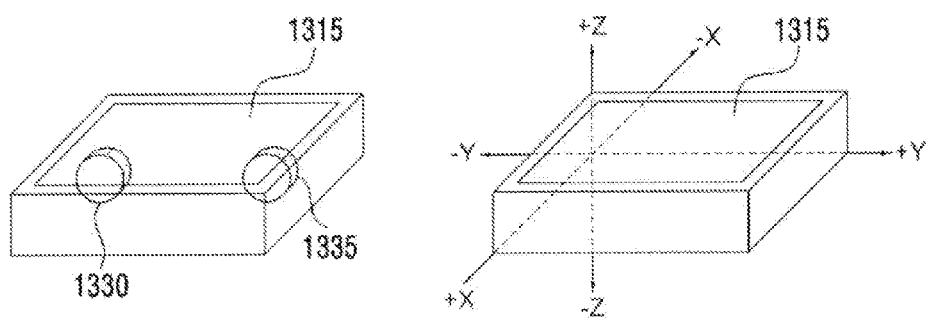
(b)          (c)

VIBRATION CONTROL DEVICE AND METHOD

PRIORITY

This application claims priority under 35 U.S.C. §119 to Korean Patent Application No. 10-2010-37046, which was filed in the Korean Intellectual Property Office on Apr. 21, 2010, the disclosure of which is incorporated herein by reference in its entirety.

BACKGROUND OF THE INVENTION

1. Field of the Invention

The present invention relates generally to vibration control, and more particularly, to a vibration control device and method for use in a portable vibration control device such as a mobile phone.

2. Description of the Related Art

When a call is received at a mobile phone including a vibration function, the mobile phone emits a ring tone according to a ring mode, and/or vibrates according to a vibration mode. Typically, upon receiving the call in the vibration mode, the mobile phone generates vibrations by driving a vibration motor at preset intervals with a preset vibration level.

SUMMARY OF THE INVENTION

The present invention is designed to provide at least the advantages described below.

According to an aspect of the invention, a vibration control device is provided, which includes a first driving unit for vibrating the vibration control device up and down; a second driving unit for moving the vibration control device left or right; and a control unit for controlling the first driving unit and the second driving unit, upon an occurrence of an event. The controller controls the second driving unit to move the vibration control device at a time when the first driving unit vibrates the vibration control device off of a surface.

According to another aspect of the invention, vibration control device is provided, which includes a first vibrator for vibrating the vibration control device in a first direction; a second vibrator for vibrating the vibration control device in a second direction perpendicular to the first direction; and a control unit for controlling at least one of the first vibrator and the second vibrator according to an event. The controller controls the second vibrator to vibrate the vibration control device at a time when the first vibrator vibrates the vibration control device off of a surface.

According to another aspect of the invention, a method for controlling vibration of a vibration control device is provided, which includes detecting an event; identifying a vibration pattern corresponding to the event; and controlling a first driving unit and a second driving unit to move the vibration control device according to the vibration pattern. The second driving unit moves the vibration control device at a time when the first driving unit vibrates the vibration control device off of a surface.

BRIEF DESCRIPTION OF THE DRAWINGS

The above and other aspects, features, and advantages of the present disclosure will become more apparent from the following detailed description of certain embodiments of the present application with reference to the accompanying drawings, in which:

FIGS. 4A through 4D are diagrams illustrating a vibration motor and a linear vibrator of a vibration control device according to an embodiment of the present invention;

FIG. 13 is a block diagram illustrating a vibration control device according to an embodiment of the present invention;

DETAILED DESCRIPTION OF EMBODIMENTS OF THE INVENTION

Figure 1:
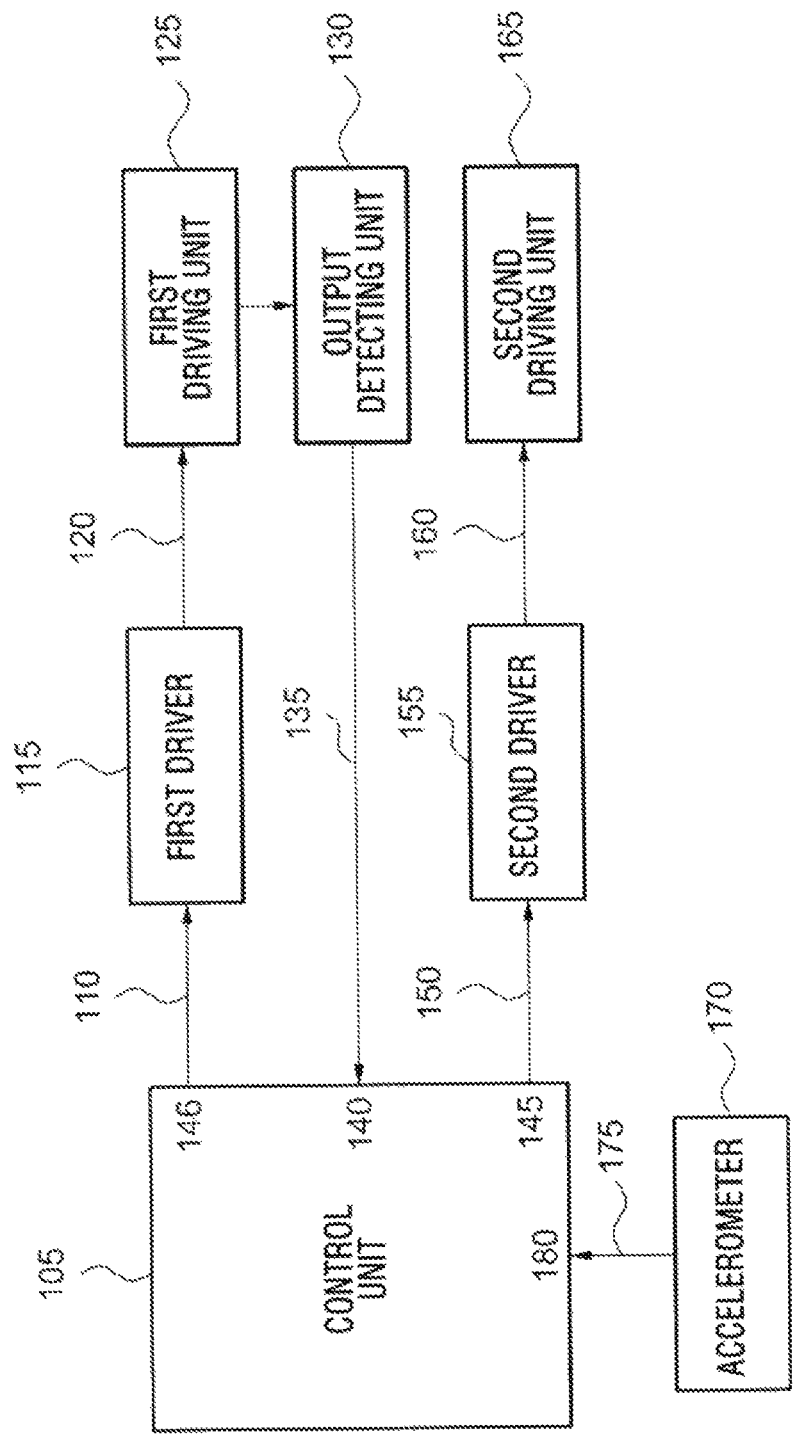
FIG. 1 is a block diagram illustrating a vibration control device according to an embodiment of the present invention.

Various embodiments of the present invention will be described in greater detail below with reference to the accompanying drawings. In the following description, like drawing reference numerals are used for the like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail to avoid obscuring the invention with unnecessary detail.

FIG. 1 is a block diagram illustrating a vibration control device according to an embodiment of the present invention.

Referring to FIG. 1, the vibration control device includes a control unit 105, a first driver 115, a first driving unit 125, a second driver 155, a second driving unit 165, an accelerometer 170, and an output detecting unit 130. The first driving unit 125 moves the vibration control device back and forth. The second driving unit 155 rotates the vibration control device clockwise or counterclockwise.

More specifically, the control unit 105 moves the vibration control device in an intended direction by controlling at least one of the first driving unit 125 and the second driving unit 155 in accordance with an event generated in the vibration control device.

The output detecting unit 130 senses an output of the first driving unit 125.

The control unit 105 includes an Analog-to-Digital (A/D) converter 180, output ports 145 and 146, and an input port 140. The first driver 115 receives a control signal 110 from the control unit 105 and outputs voltage 120 for driving the first driving unit 125. For example, the control signal 110 output via the output port 146 of the control unit 105 can be a square wave, wherein the first driver 115 receives the square wave and output DC voltage for driving the first driving unit 125.

Alternatively, the control signal 110 can also be a signal for directly driving the first driving unit 125. In this case, the first driver 115 can be accommodated in the control unit 105.

The first driving unit 125, e.g., a vibration motor, can vary a rotational speed according to a Direct Current (DC) voltage. For example, when a DC voltage of 2.6V is applied to the first driving unit 125, the Revolutions Per Minute (RPM) of the first driving unit 125 is about 4000 rpm. When the DC voltage of 3.6V is applied, the RPM of the first driving unit 125 is about 7000 rpm. For example, the first driving unit 125 can be a piezo motor or an Electro Active Polymer (EAP) motor.

The output detecting unit 130 converts the signal output from the first driving unit 125 and outputs the converted signal 135 to the control unit 105. The signal 135 output from the output detecting unit 130 triggers the control unit 105 to measure the RPM of the first driving unit 125, and controls the RPM until the first driving unit 125 attains an intended RPM.

According to an embodiment of the invention, the second driving unit 165 can be a linear vibrator that can be driven by an Alternating Current (AC) voltage. Herein, the second driver 155 can be an inverter that receives a control signal 150 from the control unit 105 and outputs the AC voltage 160 for driving the second driving unit 165. For example, the second driving unit 165 can be a piezo motor or an EAP motor.

The accelerometer 170 detects velocity changes of three axis (X, Y, and Z axes) directions and outputs a sine-wave analog signal. The output of the accelerometer 170 can be fed to the input port 180 of the control unit 105 and converted to a digital signal through the A/D converter 180 of the control unit 105. For example, the accelerometer 170 detects and outputs, to the control unit 105, the acceleration of the X, Y, and Z axis directions of the vibration control device. The control unit 105 then calculates the acceleration of the X, Y, and Z axis directions of the vibration control device using a signal 175 output from the accelerometer 170, and calculates the movement speed of the vibration control device based on the calculated acceleration.

Figure 2:
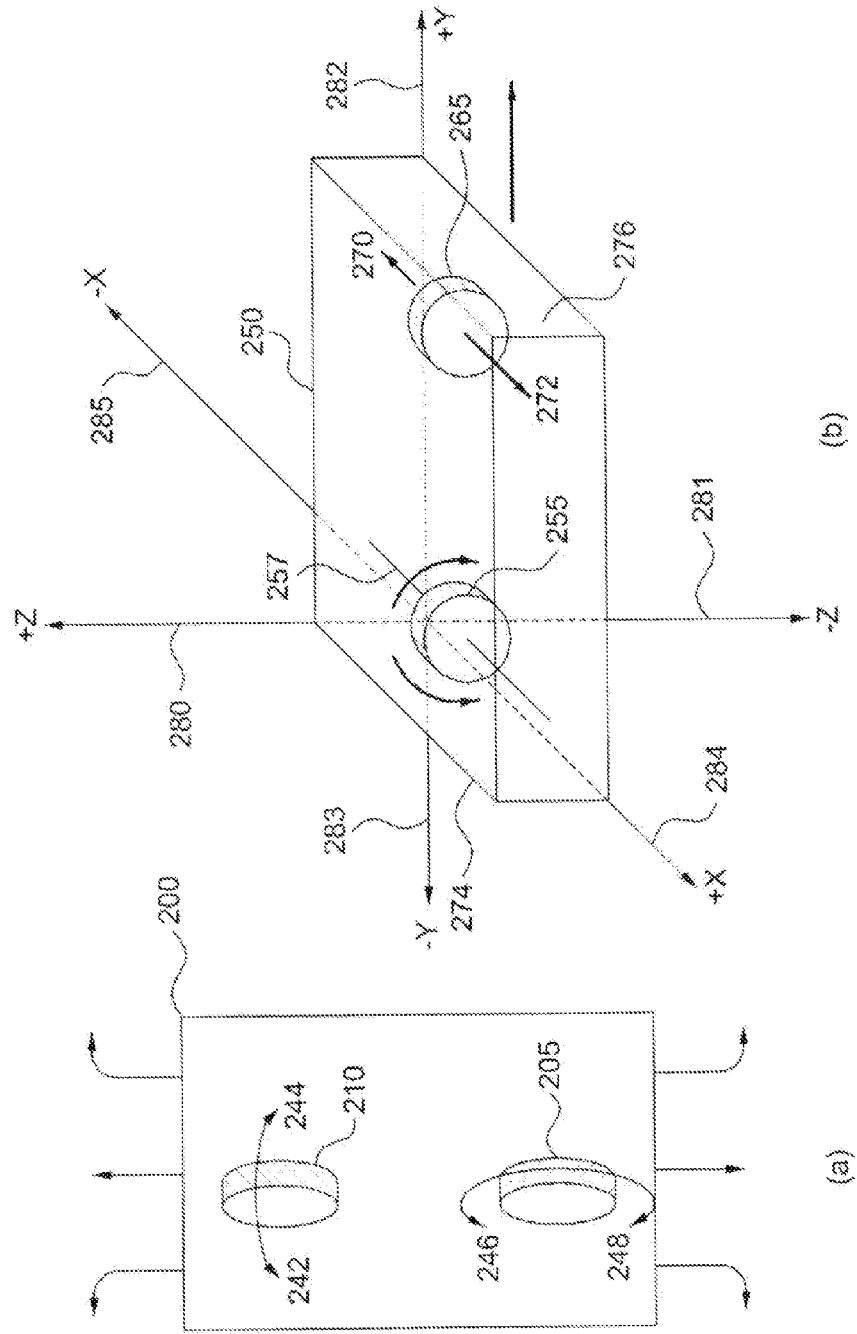
FIG. 2 is a diagram illustrating an arrangement of vibrators of a vibration control device according to an embodiment of the present invention.

FIG. 2 illustrates an arrangement of vibrators of a vibration control device according to an embodiment of the present invention.

In FIG. 2, part (a) illustrates a vibration control device 200 viewed from above. Specifically, in part (a), a vibration control device 200 includes a first driving unit 205 and a second driving unit 210. The first driving unit 205 generates vibrations in a direction 246 or a direction 248, and the second driving unit 210 generates vibrations in a direction 242 or a direction 244.

In FIG. 2, part (b) illustrates a vibration control device 250 view from the side. Specifically, in part (b), the vibration control device 250 includes a first driving unit 255 and a second driving unit 265. According to an embodiment of the invention, the first driving unit 255 generates a force that moves the vibration control device 250 in a direction 280. Herein, the direction 280 is +z-axis. The first driving unit 255 also generates a force that moves the vibration control device 250 in a first direction 282, or in a second direction 283, which is opposite to the first direction 282. More specifically, the first driving unit 255 generates a force that moves the vibration control device 250 in the +y-axis direction 282, which is defined as the first direction perpendicular to the −z axis 281, or in the −y-axis direction 283, which is defined as the second direction opposite to the first direction 282.

According to an embodiment of the invention, the first driving unit 255 and the second driving unit 265 are generally coin shaped. Further, the first driving unit 255 and the second driving unit 265 are respectively located in sides 274 and 276, which are opposite to each other, in the vibration control device 250.

For example, the first driving unit 255 can be disposed at a first edge of side 274 of the vibration control device 250, and the second driving unit 265 can be disposed at a second edge of side 276 of the vibration control device 250. The first driving unit 255 can also be disposed at the center of the first side 274 of the vibration control device 250, and the second driving unit 265 can be disposed at the center of the second side 276 of the vibration control device 250.

The first driving unit 255 has a rotation axis 257, and the second driving unit 265 is positioned in the vibration control device 250 such that the rotation axis 257 lies in parallel with the vibration directions 270 and 272 of the second driving unit 265.

The first driving unit 255 generates a force that moves the vibration control device 250 in direction 281, direction 280, or directions 282 and 283. More specifically, the first driving unit 255 generates the force that moves the vibration control device 250 according to torque. For example, the first driving unit 255 can be a vibration motor, which generates the vibration according to the torque thereof. Specifically, as the eccentric rotator rotates around the rotation axis 257, the vibration motor generates vibrations that move the vibration control device 250. Because the first driving unit 255 generates vibrations according to the rotations of the vibration motor, the vibration direction can change with time.

More specifically, the first driving unit 255 generates a force that moves the vibration control device 250 in the +z-axis direction 280, the +y-axis direction 282, the −z-axis direction 281, or the −y-axis direction 283. For example, the first driving unit 255 generates vibrations according to the rotations and the direction of the vibration changes with time. Therefore, according to the time, the vibration control device moves first in the +z-axis direction 280, in the +y-axis direction 282 after a certain time, in the z-axis direction 281 after a certain time, and then in the −y-axis direction 283 after a certain time. The vibration control device repeatedly moves in the +y-axis direction 282, the −z-axis direction 281, and the −y-axis direction 283 according to the time.

According to another embodiment of the invention, the second driving unit 265 generates a force that moves the vibration control device 250 in the x-axis directions 284 and 285. For example, the second driving unit 265 can be a linear vibrator that generates vibrations in the linear directions 270 and 272. For example, the second driving unit 265 can generate the vibration in the x-axis directions 284 and 285.

As the first driving unit 255 generates the force that moves the vibration control device 250 in direction 282 or direction 283, the second driving unit 265 can generate the force that moves the vibration control device 250 in the directions 284 and 285. For example, to move the vibration control device in directions 284 and 285, the second driving unit 265 generates the force that moves the vibration control device 250 in the direction 284 and 285 during a time when a frictional force between the vibration control device 250 and a resting surface, e.g., the ground, is minimized. Herein, the time of the minimum frictional force is when the vibration control device 250 moves in the +z-axis direction 280.

For example, when the vibration control device 250 starts to move in the +z-axis direction 280, the vibration control device 250 moves from the ground, passes a highest position from the ground, and returns to the ground again. At the highest position, the frictional force of the vibration control device 250 is at its lowest.

In order to measure the time of the minimum frictional force, the vibration control device 250 can include an accelerometer, e.g., accelerometer 170 as illustrated in FIG. 1. A control unit, e.g., control unit 105 as illustrated in FIG. 1, can then control at least one of the first driving unit 255 and the second driving unit 265 using the output of the accelerometer. Specifically, the control unit calculates the time of the minimum frictional force of the vibration control device 250 using the z-axis output signal of the accelerometer, and operates the second driving unit 265 during the time of the minimum frictional force. That is, while the vibration control device 250 moves in +z-axis direction 280, the control unit controls the second driving unit 265 to operate.

Figure 3:
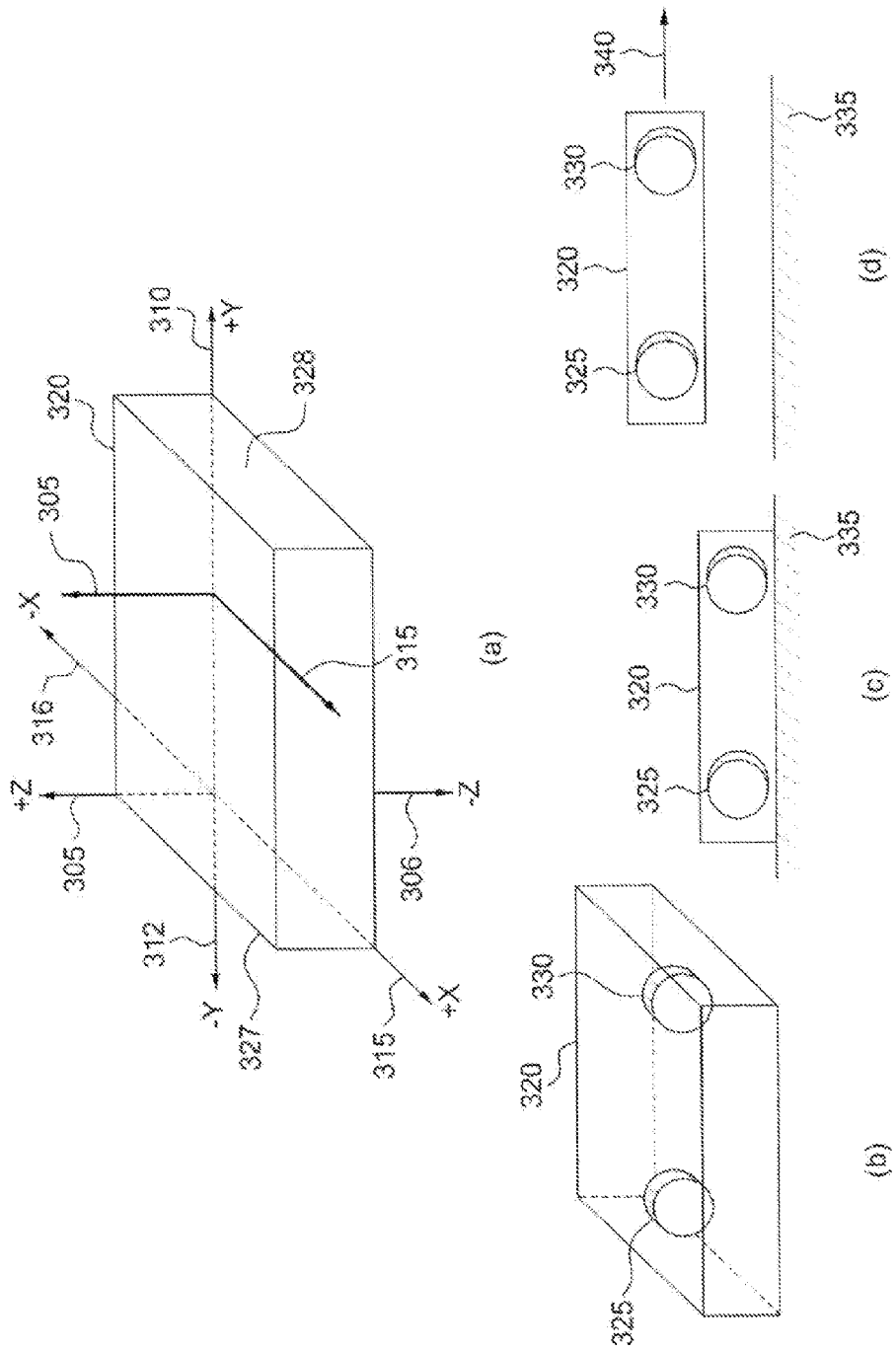
FIG. 3 is a diagram illustrating a vibration state of a vibration control device according to an embodiment of the present invention.

FIG. 3 is a diagram illustrating a vibration state of a vibration control device according to an embodiment of the invention.

Referring to FIG. 3, specifically, parts (a) and (b), a vibration control device 320 includes a first vibrator 325 for vibrating in y-axis directions 310 and 312, a second vibrator 330 for vibrating the vibration control device 320 in x-axis directions 315 and 316, and a control unit (not shown) for vibrating at least one of the first vibrator 325 and the second vibrator 330 according to an event.

In FIG. 3, the first vibrator 325 and the second vibrator 330 are positioned inside the vibration control device 320, such that the first vibrator 325 is disposed in a first edge 327 of the vibration control device 320, and the second vibrator 330 is disposed in a second edge 328 of the vibration control device 320.

The first vibrator 325 generates vibrations in a different manner from the second vibrator 330. Herein, the first vibrator 325 generates vibrations according to rotational motion, and the second vibrator 330 generates vibrations according to a reciprocating linear motion. Because the first vibrator 325 generates vibrations according to the rotational motion, the direction of the vibration changes with time. The first vibrator 325 can vibrate the vibration control device 320 in the z-axis direction 305 and 306 or in the y-axis direction 310 and 312.

In FIG. 3, part (c) illustrates the vibration control device 320 in contact with a resting surface, e.g., the ground, and part (d) illustrates the vibration control device 320 vibrated in direction 305 in the air. To effectively move the vibration control device 320 in the x-axis direction, the control unit can drive the second vibrator 330 at the time when the vibration control device 320 is floating in the air as illustrated in part (d). As described above, the vibration control device 320 measures the floating time in the air using an accelerometer. A control unit then controls the second vibrator 330 using at least one of a first signal output from the first vibrator 325 and a second signal output from the accelerometer.

More specifically, the control unit drives the first vibrator 325 to float the vibration control device 320 above the ground 335, as shown in part (d) of FIG. 3. Herein, the first vibrator 325 is a vibration motor that rotates around a rotation axis, and the first signal indicates the RPM of the vibration motor. The control unit measures the RPM of the first vibrator 325 using the first signal output from the first vibrator 325, and controls the RPM of the first vibrator 325 to make the RPM of the first vibrator 325 match the RPM of the second vibrator 330. For example, the control unit measures the RPM of the first vibrator 325 and controls the RPM of the first vibrator 325 to make the RPM of the first vibrator 325 175 Hz, which is the same as the RPM of the second vibrator 330. When the RPM of the first vibrator 325 matches the RPM of the second vibrator 330, the control unit can set a phase value of the second vibrator 330 using the second signal output from the accelerometer. For example, the control unit drives the first vibrator 325 to make the RPM of the first vibrator 325 175 Hz.

When the RPM of the first vibrator 325 becomes 175 Hz, the control unit measures a z-axis acceleration output from the accelerometer. Herein, when the z-axis acceleration value is greatest, the vibration control device 320 is located at its highest position above the ground. After the z-axis acceleration value is greatest, the vibration control device 320 starts to descend back toward the ground. Accordingly, the control unit drives the second vibrator 330 to turn the vibration control device 320 in an intended direction, at the peak of the maximum z-axis acceleration value, when the frictional force of the vibration control device 320 with the ground is at its lowest. That is, just before the signal output from the accelerometer of the vibration control device 320 is greatest, the control unit controls the second vibrator 330. In other words, while the vibration control device 320 is floating above the ground, the control unit drives the second vibrator 330 to vibrate the vibration control device 320 in the x-axis directions 315 and 316.

Figure 4A:
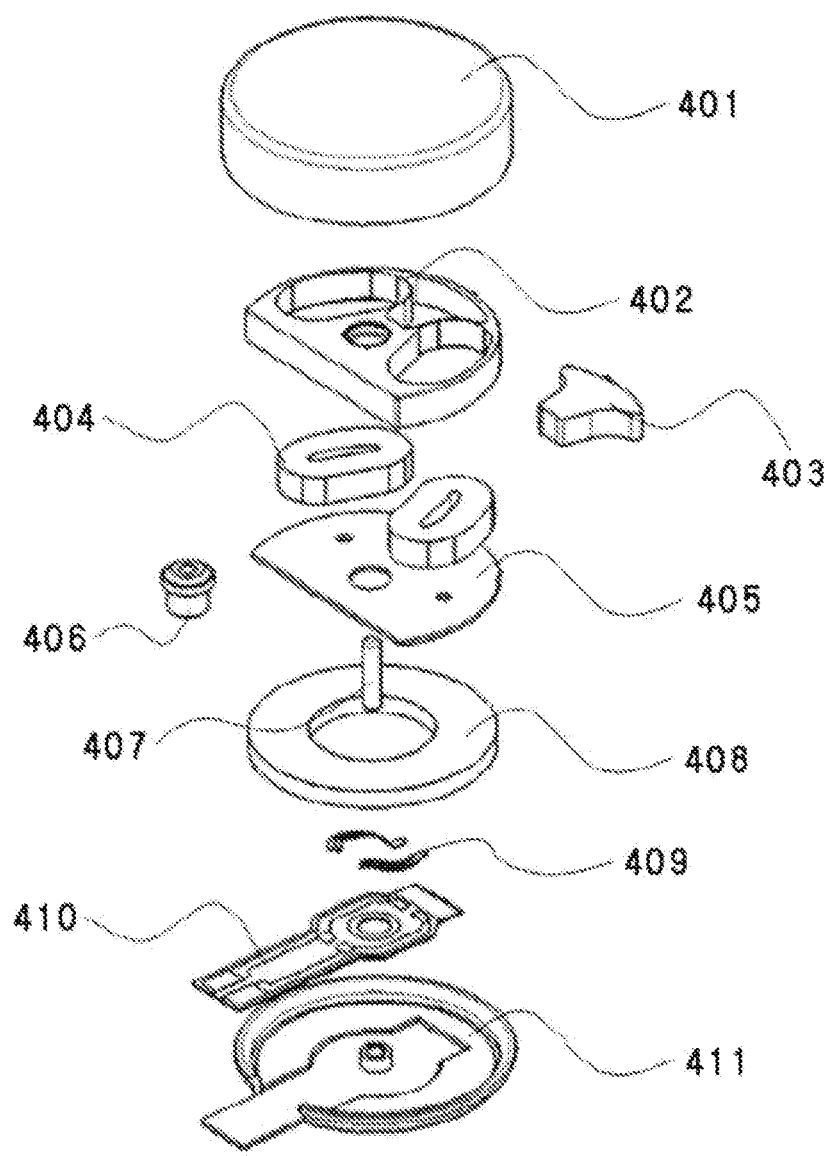
Figure 4B:
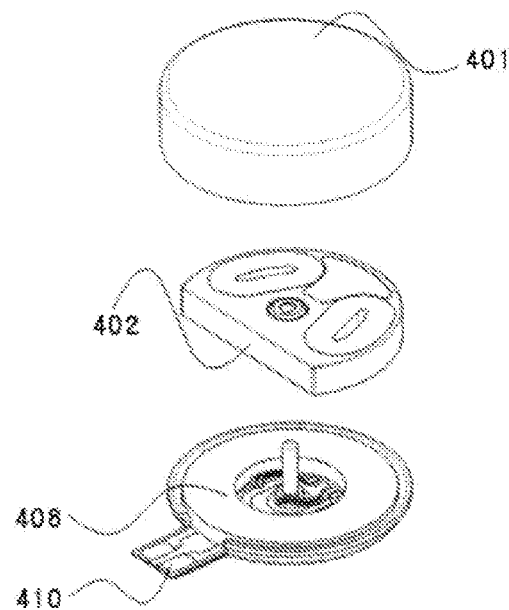
Figure 4C:
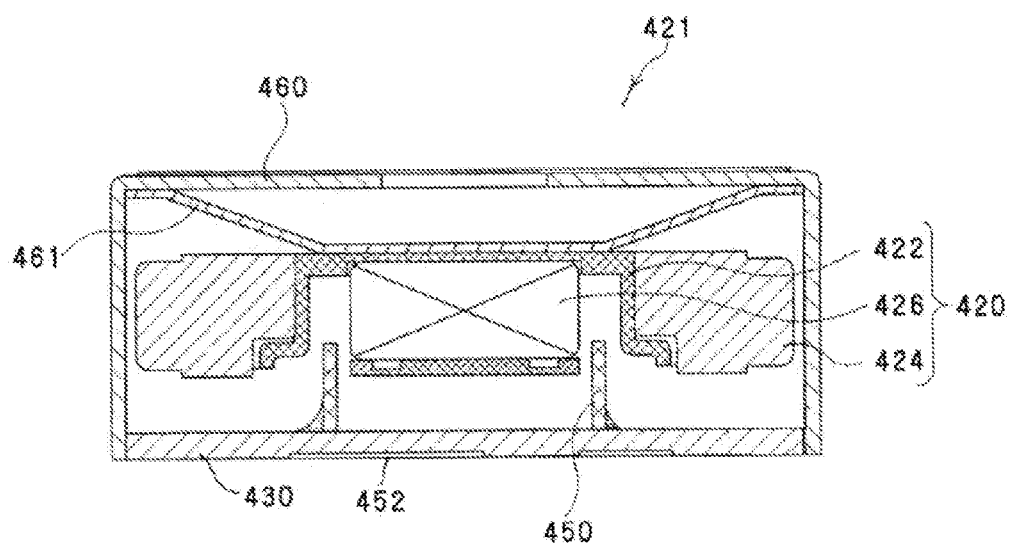

FIGS. 4A through 4D illustrate a vibration motor and a linear vibrator of a vibration control device according to an embodiment of the invention. Specifically, FIGS. 4A and 4B illustrate the vibration motor, and FIGS. 4C and 4D illustrate the linear vibrator.

In the vibration motor of FIGS. 4A and 4B, a lower Printed Circuit Board (PCB) 410 and a magnet 408 are fixed to a bracket 411, and a shaft 407 is installed upward at the center. A rotator 402, which is an injection-molded material including a coil assembly 404 for generating electromagnetic force when electricity is applied to the shaft 407, and a counter-weight 403, which is eccentric based on the shaft 407, is rotatably installed to the shaft 407. Herein, a bearing 406 is installed between the rotator 402 and the shaft 407 for supporting smooth rotations of the rotator 402. A doughnut-shaped commutator (not shown) including a plurality of segments is formed under the rotator 402. A brush 409 is fixedly installed to the lower PCB 410. The brush 409 extends to slope upward such that its front end presses and contacts the commutator to apply the electricity. Finally, a case 401 attaches to the bracket 411, enclosing the inner components.

In the vibration motor constructed as such, the current is supplied to an upper PCB 405 of the rotator 402 via the lower PCB 410 installed to the bracket 411 and the brush 409 connected to the lower PCB 410, the current supplied to the upper PCB 405 is transferred to the coil assembly 404, and thus the rotator 402 rotates around the shaft 407 according to the interaction between the coil assembly 404 and the magnet 408. Because the center of mass of the rotator 402 is displaced by the counter-weight 403, the vibration motor vibrates.

Referring to FIGS. 4C and 4D, the linear vibrator 421 includes a case 460, an elastic member 461, a vibrating body 420, and a substrate member 430. The case 460 is formed in a cylindrical shape having a certain thickness to form a space therein and including a closed upper part and an open lower part. The elastic member 461 is fixed in the case 460. The elastic member 461 is secured in the upper inner side of the case 460. The elastic member 461 can be a disc-type plate spring. The vibrating body 420 is fixed to the center of the elastic member 461.

Herein, the vibrating body 420 can include a yoke 422, a weight 424, and a magnet 426. The yoke 422 is formed of a metallic material and secured to the elastic memory 461 fixed to the upper inner side of the case 460. The yoke 422 receives the elastic force in the axial direction of the case 460 and elastically translates inside the case 460. The weight 424 is secured around the yoke 422 to increase the vibration in the translation of the vibrating body 420. The magnet 426 is fixed in the center of the yoke 422 securely enclosed by the weight 424.

The disc-type substrate member 430 is coupled under the case 460, and a winding coil 450 is secured on the substrate member 430. A connector 452 is electrically connected below the substrate member 430 to apply the power. Accordingly, when the substrate member 430 is coupled to the bottom below the case 460, the winding coil 450 is placed close to the lower part of the magnet 426 of the vibrating body 420. As a result, when the power is applied to the winding coil 450, the vibrating body 420 is excited by the interaction of the winding coil 450 and the magnet 426. When the current of the same frequency as the natural frequency of the elastic member 461 and the vibrating body 420 is supplied to the winding coil 420, the elastic member 411 and the vibrating body 420 are excited and resonated, such that the linear vibrator 420 generates vibrations.

Figure 5:
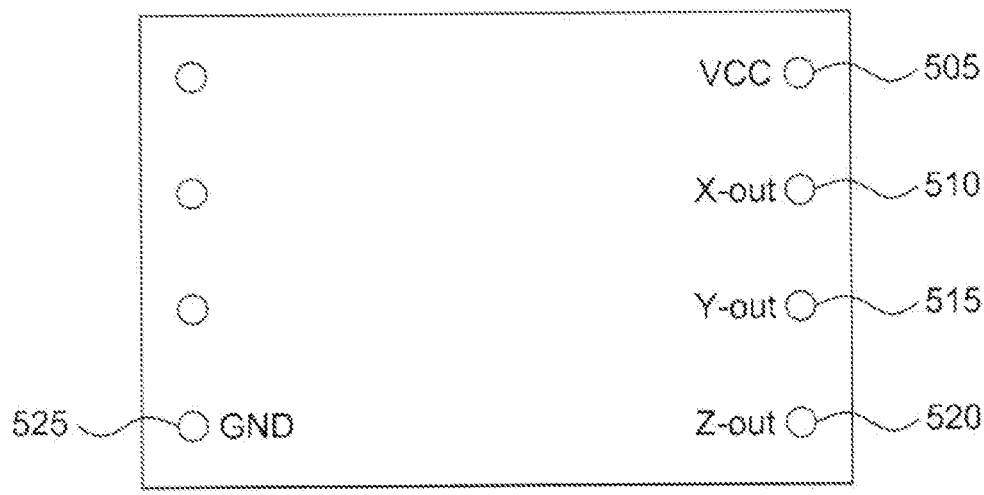
FIG. 5 is a diagram illustrating an accelerometer of a vibration control device according to an embodiment of the present invention.

FIG. 5 illustrates an accelerometer of a vibration control device according to an embodiment of the present invention.

Referring to FIG. 5, the accelerometer output accelerations of x, y, and z-axis directions. When power is applied to a power terminal 505, analog signals indicating the x, y, and z-axis accelerations are output from terminals 510, 515, and 520, respectively. The analog signals are input to the control unit through an A/D converter. The accelerometer also includes a ground (GND) 525.

Figure 6:
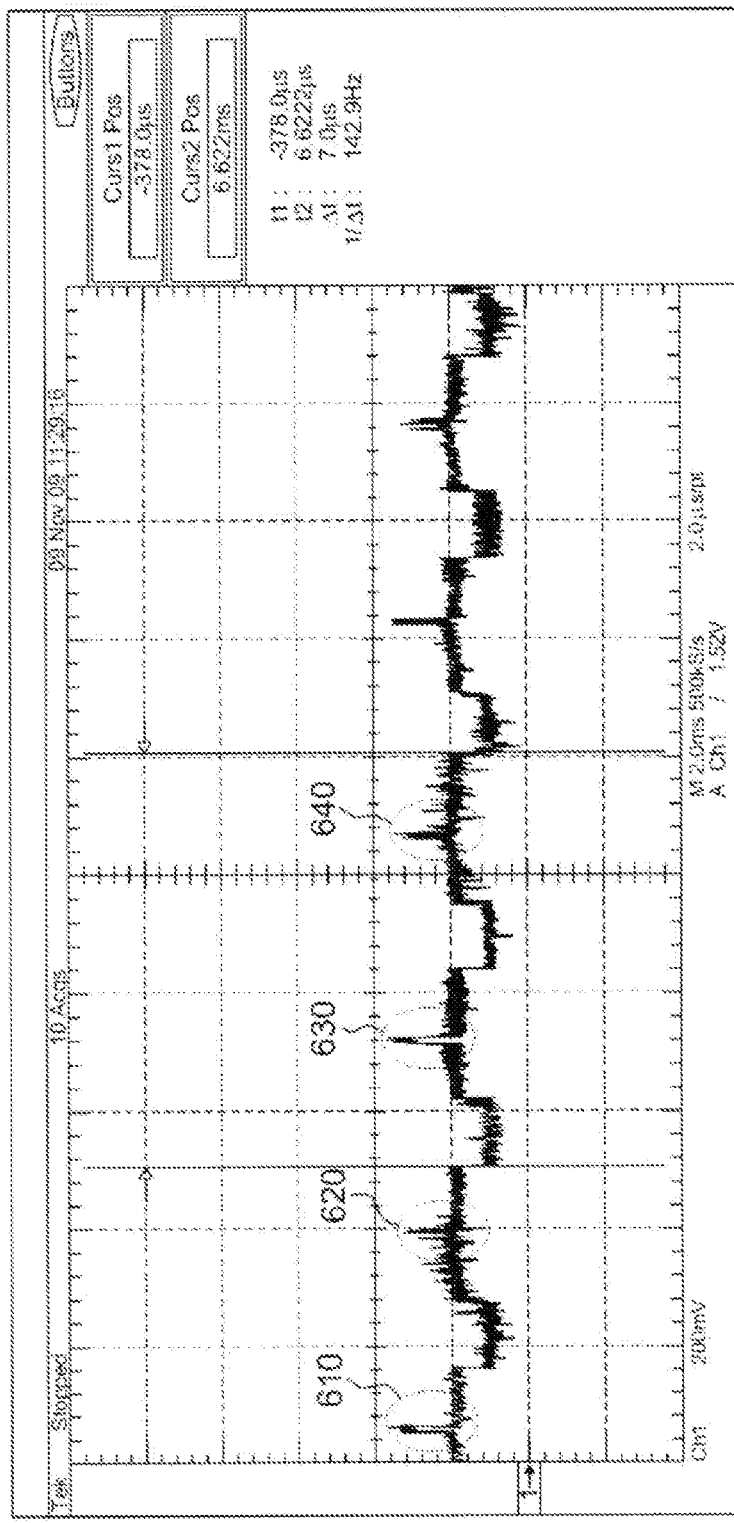
FIG. 6 is a diagram illustrating a waveform measuring Revolutions Per Minute (RPM) of a vibration motor of a vibration control device according to an embodiment of the present invention.

FIG. 6 illustrates a waveform measuring RPMs of a vibration motor of a vibration control device according to an embodiment of the present invention.

Referring to FIG. 6, during one rotation, the vibration motor outputs four pulses 610, 620, 630, and 640. The control unit measures the RPMs of the vibration motor by counting the pulses 610, 620, 630, and 640.

Figure 7:
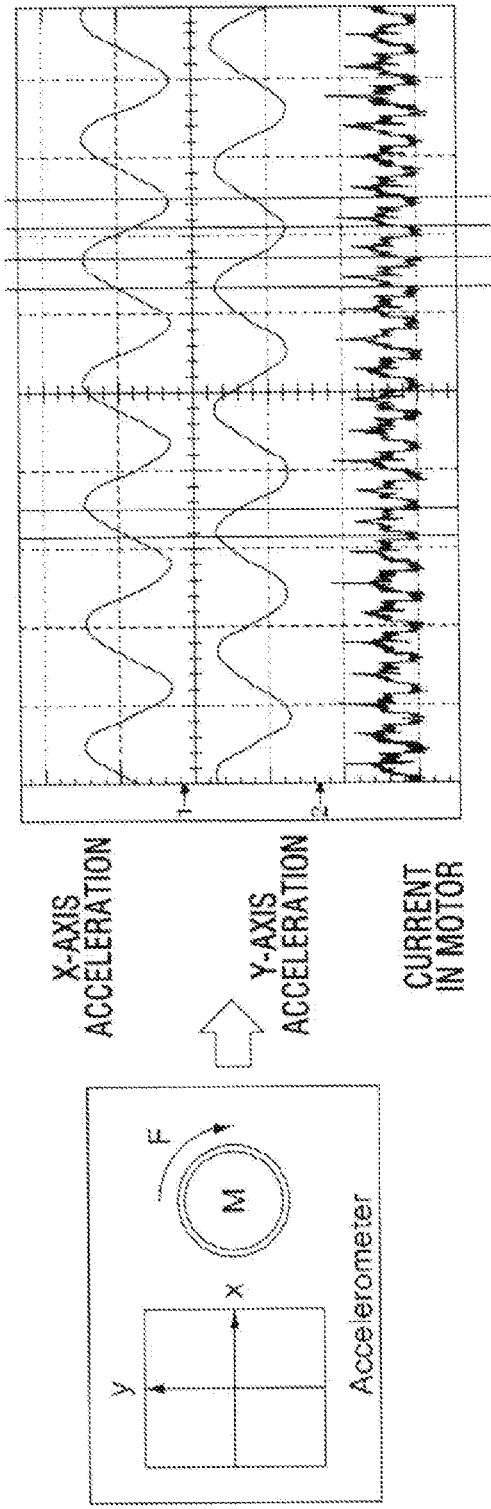
FIG. 7 is a diagram illustrating an output waveform of an accelerometer and an output waveform of a vibration motor of a vibration control device according to an embodiment of the present invention.

FIG. 7 illustrates an output waveform of an accelerometer and an output waveform of a vibration motor according to an embodiment of the present invention.

Referring to FIG. 7, signals output according to the x-axis acceleration and the z-axis acceleration, and the rotation of the vibration motor of the vibration control device are illustrated. The output of the accelerometer is a sine-wave type accelerometer, which periodically repeats the acceleration value with time.

Figure 8:
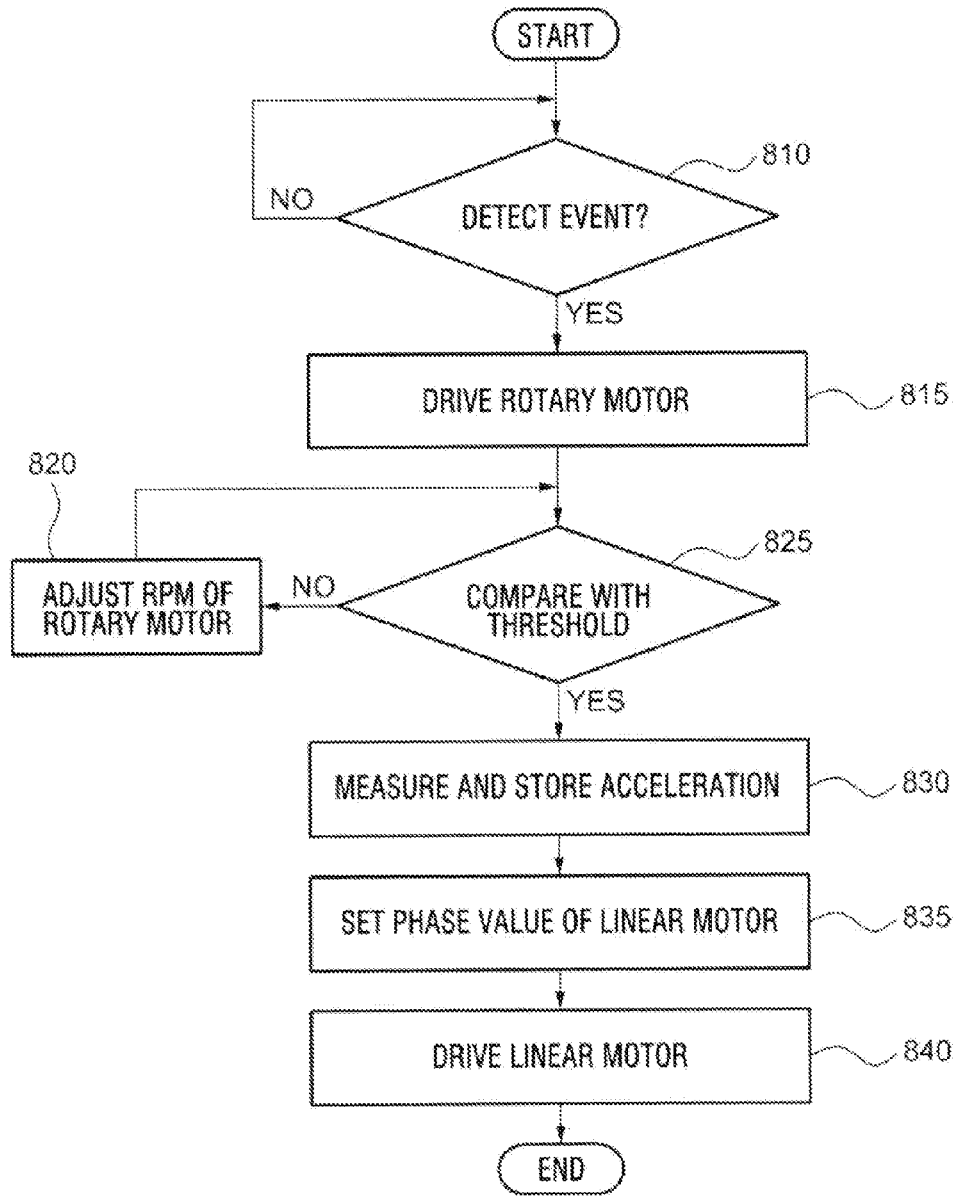
FIG. 8 is a flowchart illustrating a processing method of a vibration control device according to an embodiment of the present invention.

FIG. 8 is a flowchart illustrating a processing method of a vibration control device according to an embodiment of the present invention.

Referring to FIG. 8, when detecting an event in step 810, a control unit drives a first driving unit, e.g., a rotary motor, in step 815. As the rotary motor drives in step 815, the control device vibrates in a z-axis direction and a y-axis direction, moving backward or forward. The control unit measures and compares the RPMs of the rotary motor with a threshold in step 825. According to an embodiment of the invention, the RPM threshold of a rotary motor is 175 Hz, and the threshold is equal to the RPM of the second vibrator.

When the RPM of the rotary motor does not meet the threshold (for example, 175 Hz) according to the comparison result, the control unit changes the voltage applied to the rotary motor until the RPM reaches 175 Hz in step 820. When the RPM of the rotary motor is equal to the threshold in step 825, the control unit measures the z-axis acceleration of the vibration control device output from the accelerometer and stores the measured z-axis acceleration to a storage unit such as memory in step 830.

In step 835, the control unit sets a phase value to determine a driving point of a linear vibrator, which is a second driving unit. For example, the control unit can determine a region where the z-axis direction acceleration increases and decreases, as the driving point in step 835.

In step 840, the control unit drives the second vibrator according to the driving point and turns the vibration control device to the left or to the right, which is the x-axis direction. That is, when viewed from above, the control unit turns the vibration control device clockwise or counterclockwise.

More specifically, as described above, when the vibration control device starts to vibrate in the +z-axis direction according to the first vibrator, the z-axis acceleration increases. When the vibration control device starts to move in the −z-axis direction, the z-axis acceleration decreases. Accordingly, when the z-axis acceleration is at its highest point, the vibration control device is at its highest point above the ground. At this highest point, i.e., the drive point, the control unit drives the second vibrator.

Figure 9:
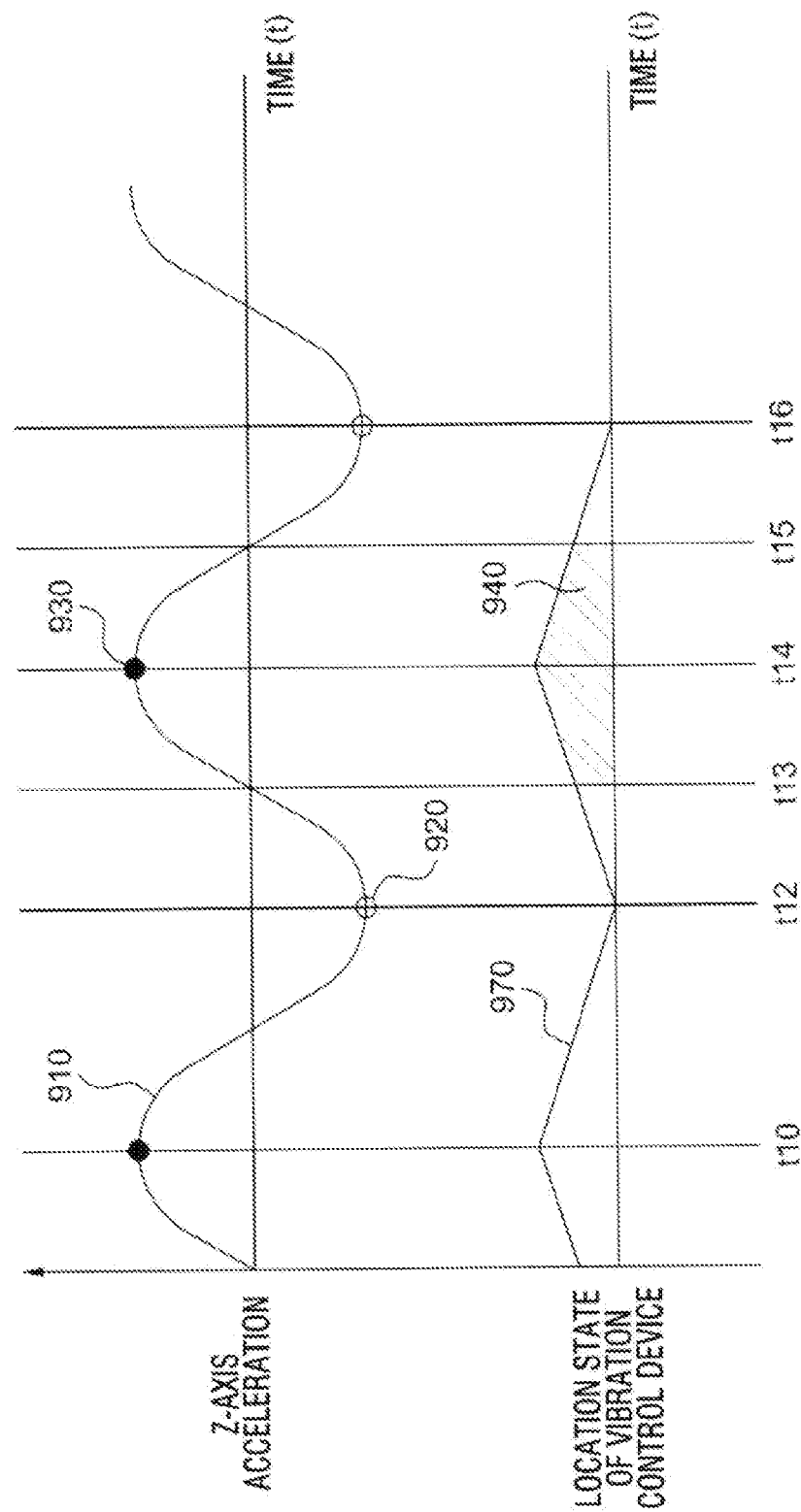
FIG. 9 is a diagram illustrating a state of a vibration control device, acceleration in a Z-axis direction, and speed, according to an embodiment of the present invention.

FIG. 9 is a diagram illustrating a state of a vibration control device and an acceleration in a z-axis direction according to an embodiment of the present invention.

Referring to FIG. 9, a graph 910 shows the acceleration when the vibration control device moves in the z-axis direction, and a graph 970 shows a conceptual position of the vibration control device. Herein, a dark dot 930 on the graph 910 indicates the highest position of the vibration control device above the ground, and a white dot 920 indicates the contact point of the vibration control device with the ground. At the times t10 and t14, the vibration control device lies at the highest point above the ground, and the z-axis acceleration of the vibration control device is greatest. At the times t12 and t16, the vibration control device is in contact with the ground, and the z-axis acceleration of the vibration control device is lowest.

According to the graph 970, the vibration control device is away from the ground and floating in the air for a certain time based on the time t14, when the vibration control device reaches the highest position. That is, the vibration control device floats in the air in an interval 940 between the time t13 and the time t15. Because the frictional force between the vibration control device and the ground is low, the vibration control device is moved in the intended direction between the time t13 and the time t15. That is, the control unit controls the vibration control device to turn in the intended x-axis direction between the time t13 and the time t15.

Figure 10:
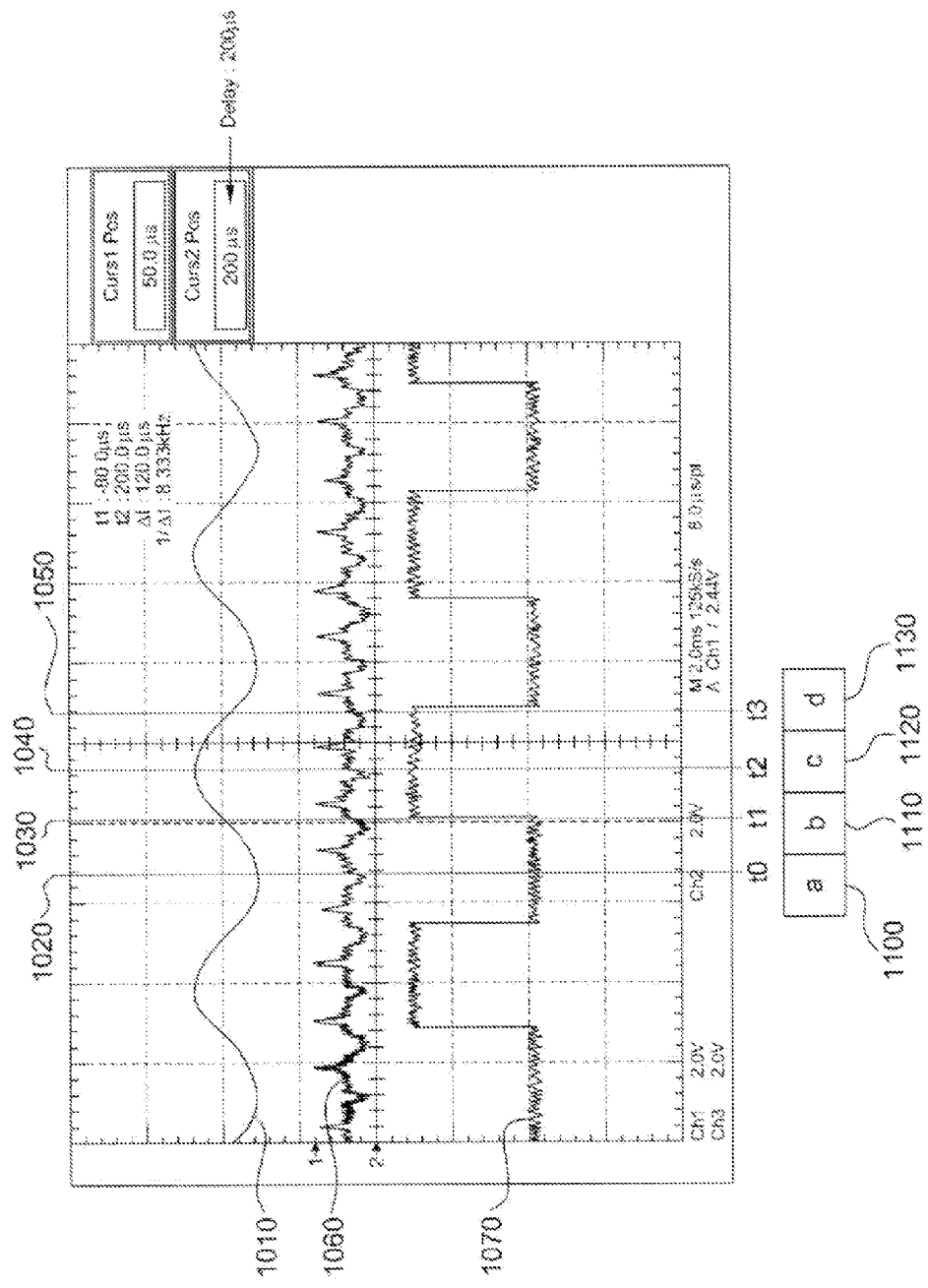
FIG. 10 is a diagram illustrating an output waveform of an accelerometer, an output waveform of a vibration motor, and a pulse shape for driving a linear vibrator of a vibration control device according to an embodiment of the present invention.

FIG. 10 illustrates an output waveform of an accelerometer, an output waveform of a vibration motor, and a pulse shape for driving a linear vibrator in a vibration control device according to an embodiment of the present invention.

Referring to FIG. 10, a z-axis acceleration signal 1010 of the vibration control device, a rotation output signal 1060 that is output according to the rotation of the vibration motor, and a control signal 1070 for driving the linear vibrator are illustrated.

The z-axis acceleration signal 1010 of the vibration control device implies that the vibration control device moves in the z-axis direction. More specifically, the acceleration signal 1010 indicates that the z-axis acceleration of the vibration control device varies according to the time. The acceleration signal 1010 and the control signal 1070 iterate at the same intervals. According to an embodiment of the present invention, the vibration motor, which is the first vibrator, generates four pulses per rotation. The control unit is synchronized by the pulses output from the vibration motor and generates interrupt. For each interrupt, the control unit reads and stores the z-axis direction acceleration value to the memory.

More specifically, at t0 1020 of an initial interrupt, the control unit reads and stores the z-axis acceleration value a to a memory location 1100. At t1 1030 of a second interrupt, the control unit reads and stores the z-axis acceleration value b to a memory location 1110. At t2 1040, the control unit reads and stores the z-axis acceleration value c to a memory location 1120. At t3 1050, the control unit reads and stores the z-axis acceleration value d to a memory location 1130. As such, the control unit measures and stores to the memory, the four acceleration values in one cycle of the acceleration signal. The control unit compares the four acceleration values stored to the memory.

According to the acceleration signal 1010, the acceleration value is greatest at t2. Therefore, the control unit determines that the acceleration value c at t2 is greatest among the values stored to the memory. That is, the control unit determines that the vibration control device is placed at the highest position above the ground at the time t2. Using the four z-axis acceleration values stored to the memory, the control unit determines the time to drive the second vibrator.

According to an exemplary embodiment of the invention, the vibration control device contacts the ground at the time t0 and floats in the air for the times t1, t2 and t3. Therefore, the control unit turns the vibration control device in the intended direction by driving the second vibrator during the times t1 through t3.

More specifically, because the acceleration value is greatest at the time t2, the control unit drives the second vibrator at t1 right before the maximum acceleration value. At the time t3, the control unit stops the second vibrator or vibrates the second vibrator in the opposite direction. As such, the control unit drives the second vibrator before the maximum z-axis acceleration value, and stops the second vibrator or drives the second vibrator in the opposite direction after the maximum z-axis acceleration value. That is, the control unit supplies an AC signal for driving the second vibrator at the time t1 before the maximum z-axis acceleration value, and an AC signal of the opposite polarity to the second vibrator at the time t3 after the maximum z-axis acceleration value. Because the second vibrator vibrates in the reciprocating motion, the control unit supplies the AC signal of the opposite polarity when the vibration control device contacts the ground and thus controls to minimize the force of the vibration control device returning to the opposite rotation direction.

Figure 11:
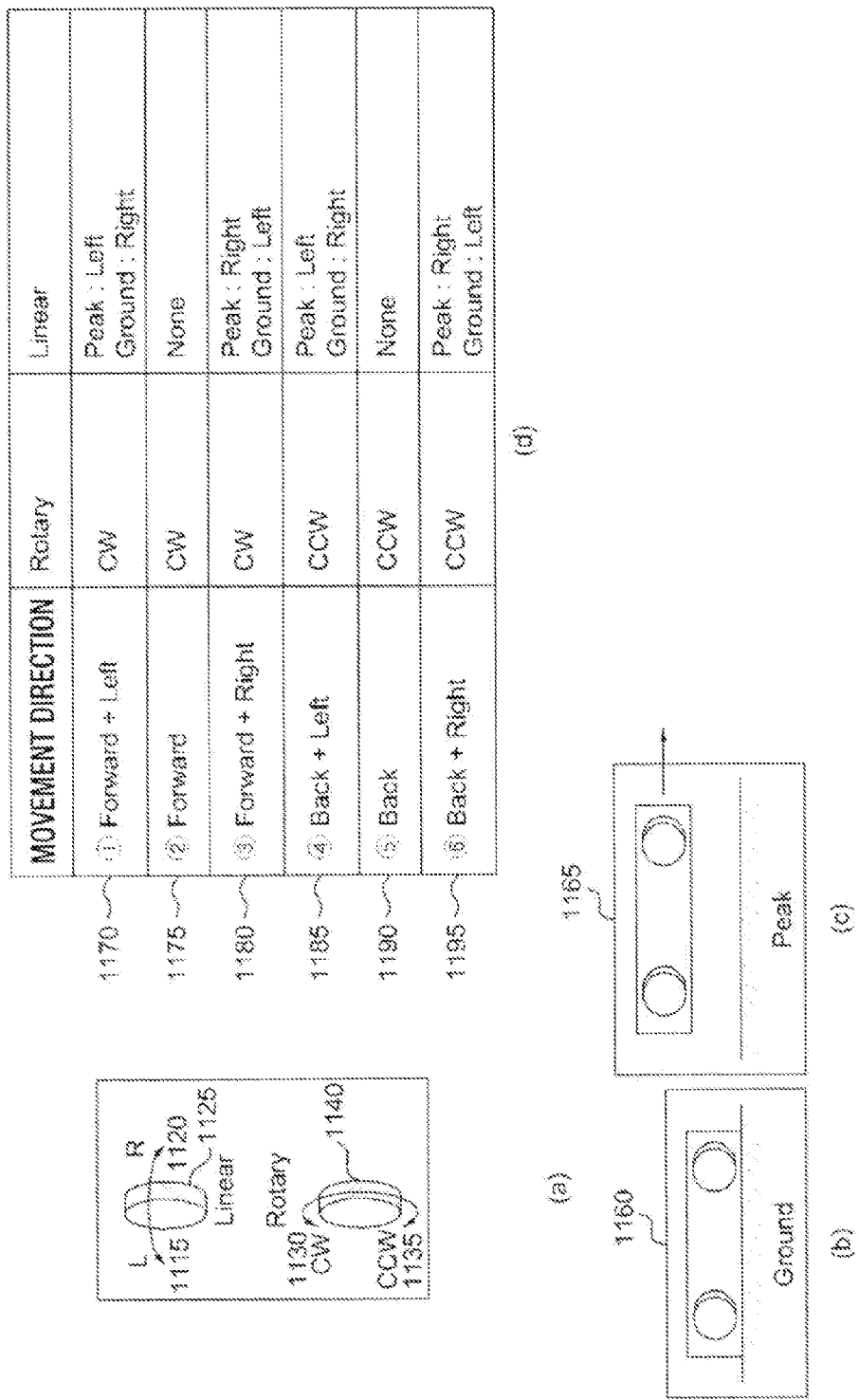
FIG. 11 is a diagram illustrating a movement direction according to a vibrator arrangement of a vibration control device according to an embodiment of the present invention.

FIG. 11 illustrates vibration directions of a first vibrator and a second vibrator and movement directions of a vibration control device according to an embodiment of the present invention.

Referring to FIG. 11, in part (a), a first vibrator 1140 is a rotary motor and a second vibrator 1125 is a linear vibrator. The first vibrator 1140 rotates ClockWise (CW) 1130 or CounterClockWise (CCW) 1140. The second vibrator 1125 vibrates to the left 1115 or to the right 1120.

Part (b) of FIG. 11 illustrates a ground state 1160 where the vibration control device is in contact with the ground.

Part (c) of FIG. 11 illustrates a peak state 1165 where the vibration control device is floating in the air. To change the vibration control device in the intended direction, the second vibrator 1125 is vibrated in the intended direction in the peak state 1165 and the second vibrator 1125 is vibrated in the opposite direction of the intended direction in the ground state 1160.

Referring parts (a) and (d) of FIG. 11, to move the vibration control device forward and to the left 1170, the first vibrator 1140 rotates CW 1130 and the second vibrator 1125 vibrates to the left 1115, when the vibration control device is in the peak state, and vibrates to the right 1120, when the vibration control device is in the ground state.

To move the vibration control device forward 1175, the first vibrator 1140 rotates CW 1130 and the second vibrator 1125 does not operate.

To move the vibration control device forward and to the right 1180, the first vibrator 1140 rotates CW 1130 and the second vibrator 1125 vibrates to the right 1120, when the vibration control device is in the peak state, and vibrates to the left 1115, when the vibration control device is in the ground state.

To move the vibration control device backward and to the left 1185, the first vibrator 1140 rotates CCW 1135 and the second vibrator 1125 vibrates to the left 1115, when the vibration control device is in the peak state, and vibrates to the right 1120, when the vibration control device is in the ground state.

To move the vibration control device backward 1190, the first vibrator 1140 rotates CCW 1135 and the second vibrator 1125 does not operate.

To move the vibration control device backward and to the right 1195, the second vibrator 1125 vibrates to the right 1120, when the vibration control device is in the peak state, and vibrates to the left 1115, when the vibration control device is in the ground state.

Figure 12:
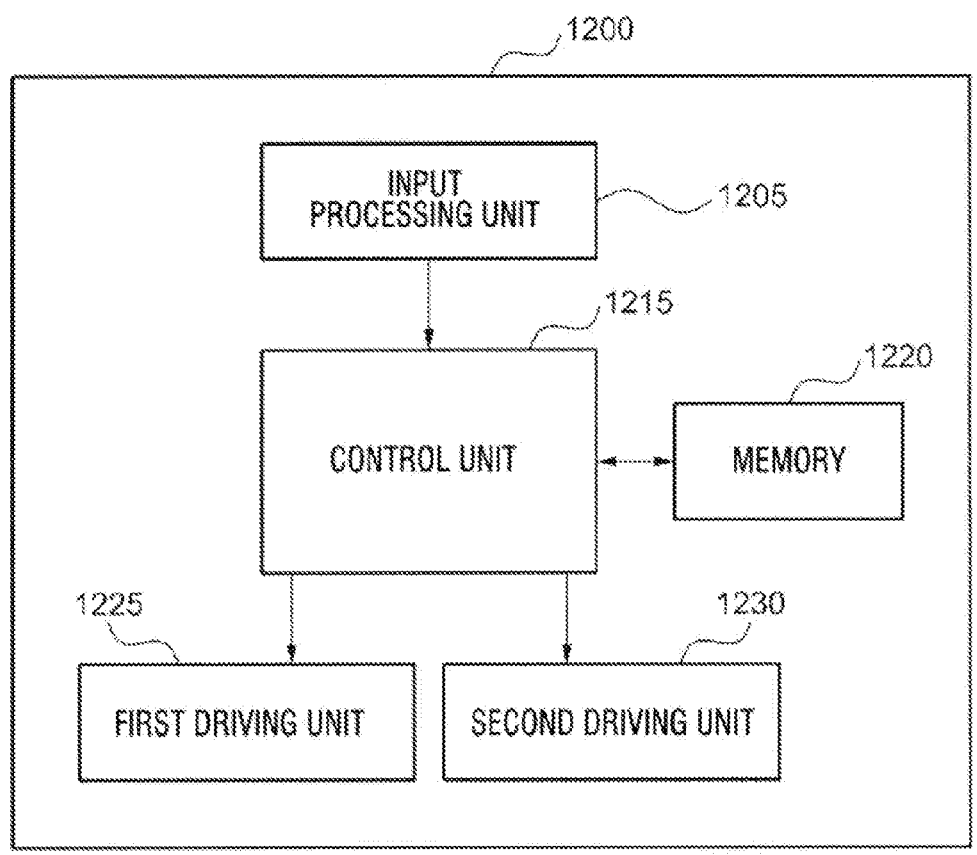
FIG. 12 is a block diagram illustrating a vibration control device according to an embodiment of the present invention.

FIG. 12 is a block diagram of a vibration control device according to another embodiment of the present invention.

Referring to FIG. 12, a vibration control device 1200 includes an input processing unit 1205, a control unit 1215, a memory 1220, a first driving unit 1225, and a second driving unit 1230. The input processing unit 1205 receives and sends a signal input by a user to the control unit 1215. The input processing unit 1205 can receive a signal input over a communication network and send a corresponding signal to the control unit 1215, and receive signals from sensors of the vibration control device 1200 and send the signals to the control unit 1215. For example, the input processing unit 1205 can receive a signal input by the user via a keyboard, a touch screen, a microphone, or a mouse and send the signal to the control unit 1215. The input processing unit 1205 can send the signal received over an external communication network for $3^{rd}$ Generation mobile telecommunications (3G), Code Division Multiple Access (CDMA), Global Systems for Mobile communication (GSM), Long Term Evolution (LTE), $4^{th}$ Generation mobile telecommunications (4G), WiFi®, or Bluetooth®, to the control unit 1215. The input processing unit 1205 can receive signals from a proximity sensor, a geomagnetic sensor, a temperature sensor, an illuminance sensor, and the accelerometer, and send the signals to the control unit 1215. Herein, the control unit 1215 can receive the signal input through the input processing unit 1205 and generate the corresponding event.

For example, when the vibration control device 1200 includes a proximity sensor and a user gets close, the vibration control device 1200 can rotate or move in the predetermined direction. When the vibration control device 1200 includes the geomagnetic sensor, the vibration control device 1200 can function as an electronic compass and rotate in a particular direction. When the vibration control device 1200 includes the temperature sensor and reaches a particular temperature, the vibration control device 1200 can rotate or move in a particular direction. When the vibration control device 1200 includes the illuminance sensor, the vibration control device 1200 can rotate or move in response to an ambient brightness. When the vibration control device 1200 includes a GPS receiver and performs a navigation function, the vibration control device 1200 can rotate or move according to its location information.

The control unit 1215 generates an event in response to the signal received from a timer of the vibration control device 1200. That is, the event can be at least one of the signal generated in the vibration control device 1200, the signal received from the outside of the vibration control device 1200, and the signal input by the user. For example, when the vibration control device 1200 is a mobile phone, the timer of the control unit of the mobile phone can issue the event. For example, the event can take place according to an alarm, a wakeup call, or a schedule alarm generated by the timer. That is, when a specific time arrives, the vibration control device 1200 can rotate or move in a predefined direction.

The control unit 1215 can generate the event in response to a signal receive from a battery, which can be accommodated in the vibration control device 1200. For example, when the battery falls below a particular voltage, the control unit 1215 can detect the event and rotate or move the vibration control device 1200 in a particular direction.

The event can also be when a call, a Short Message Service (SMS) message, or a Multimedia Message Service (MMS) message is received.

Also, the event can take place according to the user's input. When the user presses a button of the mobile phone or touches the touch screen, the event can take place according to the generated signal.

Using a parameter input from the user or a predetermined value, the control unit 1215 can output a control signal corresponding to the event to at least one of the first driving unit 1225 and the second driving unit 1230. The control signal can be a signal for determining an operation point, an operation duration, or a halt point of at least one of the first driving unit 1225 and the second driving unit 1230. The control signal can determine the driving direction of at least one of the first driving unit 1225 and the second driving unit 1230.

The memory 1220 can store the parameter input from the user or the predetermined value. The control unit 1215 can provide a Graphic User Interface (GUI) for receiving the parameter from the user. For example, when a specific person calls and the vibration control device 1200 is to move to forward and to the right, the user can input the name of the specific person through the GUI and the parameter to rotate the first driving unit 1225 clockwise and to vibrate the second driving unit 1230 to the right in the peak state and to the left in the ground state.

The parameter can be the value for determining the operation point, the operation duration, and the halt point of the first driving unit 1225 or the second driving unit 1230. The parameter can be the value for determining the rotation direction of the first driving unit 1225 or the vibration direction of the second driving unit 1230. The parameter can be the name of the specific person as input by the user through the GUI.

The vibration control device 1200 can rotate or move in the different direction depending on the name of the caller. For example, when the call comes from a person A, the vibration control device 1200 can rotate to the right. When the call comes from a person B, the vibration control device 1200 can rotate to the left.

When the event takes place, the control unit 1215 can generate an adequate motion pattern corresponding to the event using the parameter stored to the memory 1220. For example, according to the generated event, the control unit 1215 can move the vibration control device 1200 forward and to the left, forward, forward and to the right, backward and to the left, backward, or backward and to the right. The control unit 1215 can form a more complicated operation pattern by combining the six basic operation patterns.

For example, when a text message is received from a specific person, the control unit 1215 can generate the operation pattern such that the vibration control device 1200 moves forward and rotates to the right, moves backward, and rotate to the left. When the event takes place using the predetermined value, the control unit 1215 can generate an adequate motion pattern corresponding to the event. For example, when there is no parameter input by the user in case of the alarm, the control unit 1215 can move the vibration control device forward using the predetermined value.

FIG. 13 is a block diagram illustrating a vibration control device according to another embodiment of the present invention.

Referring to FIG. 13, the vibration control device 1300 includes a screen display unit 1315 for showing the operation state of the vibration control device 1300, a first driving unit 1330 for vibrating the vibration control device 1300 in the z-axis direction perpendicular to the screen display unit 1315 or in the y-axis direction perpendicular to the z-axis, a second driving unit 1335 for vibrating the vibration control device 1300 in the x-axis direction perpendicular to the y-axis direction, a control unit 1310 for controlling at least one of the first driving unit 1330 and the second driving unit 1335 in accordance with an event generated in the vibration control device 1300, an accelerometer 1320, and a sound source storage unit 1325 for storing sound sources.

The screen display unit 1315, e.g., a Liquid Crystal Display (LCD), can be formed in a quadrangular glass plate shape. The screen display unit 1315 can be a touch screen to send to the control unit 1310 the input from the user through the GUI displayed in the touch screen. The first driving unit 1330 vibrates the vibration control device 1300 in the z-axis direction or the y-axis direction. The first driving unit 1330 may include a vibration motor that generates vibrations according to the rotary motion of the motor by connecting an eccentric weight to a rotation axis thereof. The vibration motor, which generates the vibration according to the rotations, can change its vibration direction with time. That is, the vibration motor can first generate vibrations in the z-axis direction, in the y-axis direction after a certain time, and then in the z-axis direction after more time.

The second driving unit 1335 vibrates the vibration control device in the x-axis direction. The second driving unit 1335 may include a linear vibrator that vibrates based on the linear motion. The linear vibrator generates the vibration according to the reciprocating motion, and the AC signal can be used to drive the linear vibrator. The AC signal periodically repeats the polarity with time. The linear vibrator vibrates by conducting the reciprocating motion according to the AC signal.

When an event occurs in the vibration control device 1300, the control unit 1310 generates the vibration pattern corresponding to the event. The vibration pattern can be pre-stored in a memory (not shown) in accordance with the event. Alternatively, the control unit 1310 may generate a new vibration pattern using a parameter input by a user when the event takes place. The control unit 1310 can control the first driving unit 1330 and/or the second driving unit 1335 using the vibration pattern corresponding to the event.

The accelerometer 1320 measures accelerations in the x, y and z axis directions. Using a signal output from the accelerometer 1320, the control unit 1310 can control at least of the first driving unit 1330 and/or the second driving unit 1335. For example, when the output of the accelerometer 1320 is greatest, the control unit 1310 can operate the second driving unit 1335 to rotate the vibration control device 1300 in the intended direction.

The sound source storage unit 1325 stores sound sources. The control unit 1310 can control at least one of the first driving unit 1330 and the second driving unit 1335 using the sound source stored to the sound source storage unit 1340. Herein, the sound sources can be digital sound sources such as MP3, Windows Media Audio (WMA), OGG, WAV, and Pulse Code Modulation (PCM). The control unit 1310 can drive the first driving unit 1330 or the second driving unit 1335 by reading and analyzing the sound source from the sound source storage unit 1340. For example, the sound source can include metadata indicating a music genre. Upon analyzing the metadata and determining the pop genre of the sound source, the control unit 1310 rapidly drives the first driving unit 1335 to move the vibration control device 1300 forward or backward fast. That is, the control unit 1310 can control the vibration control device 1300 to vibrate in different ways according to the type of the sound source, such as genre, tempo, and composer of the sound source.

Figure 14:
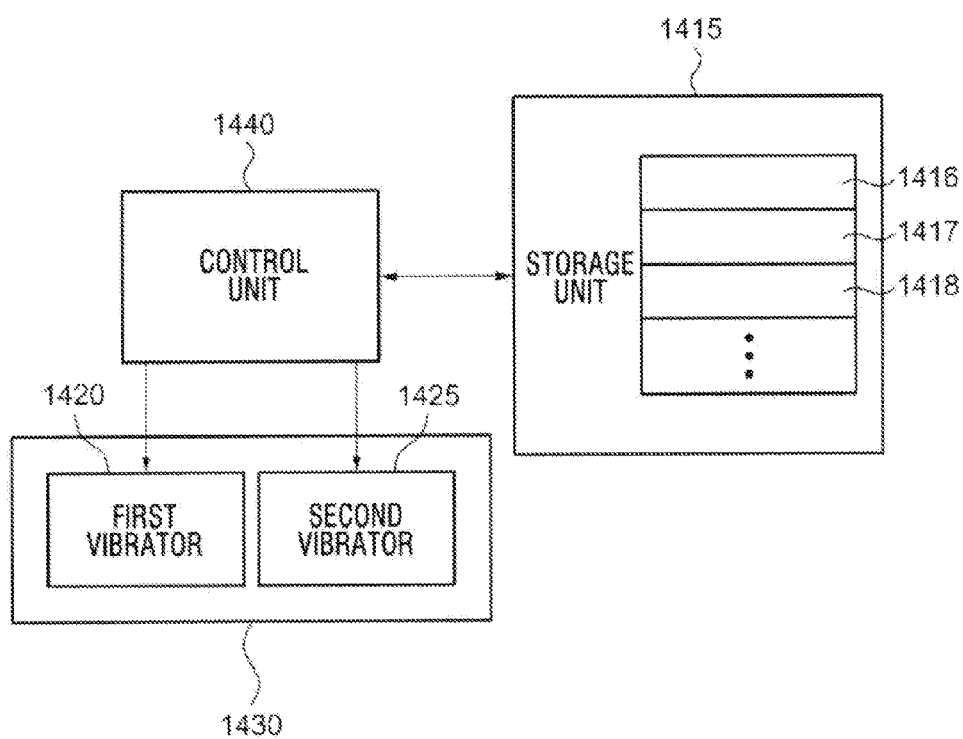
FIG. 14 is a block diagram illustrating a vibration control device according to an embodiment of the present invention.

FIG. 14 is a block diagram illustrating a vibration control device according to another embodiment of the present invention.

Referring to FIG. 14, the vibration control device includes a plurality of vibrators 1430 for generating vibrations in different manners, a storage unit 1415 for storing a plurality of the vibration patterns, and a control unit 1440 for controlling at least one of the vibrators 1430 using at least one of the vibration patterns stored to the storage unit 1415, upon an occurrence of an event. In FIG. 14, as an example, the vibrators 1430 include a first vibrator 1420 and a second vibrator 1425, each of which is driven in a different manner. For example, the first vibrator 1420 generates vibrations according to a rotary motor, and the second vibrator 1425 generates vibrations according to linear motion, i.e., the reciprocating linear motion.

The storage unit 1415 stores the plurality of the vibration patterns for determining the vibration point, vibration direction, and the vibration time of the vibrators 1430. For example, the storage unit can includes magnetic media such as a hard disc, a floppy disc, or magnetic tape, optical media such as CD-ROM or DVD, magneto-optical media such as a floptical disk, or a computer-readable recording media such as a ROM, a RAM, and a flash memory.

For example, the storage unit 1415 stores a first vibration pattern 1416, a second vibration pattern 1417, and a third vibration pattern 1418. The vibration patterns 1416, 1417, and 1418 each include data for driving the vibrators 1430. For example, the first vibration pattern 1416 includes data for rotating the first vibrator 1420 clockwise for 30 seconds and vibrating the second vibrator 1425 for 5 seconds. Using the first vibration pattern 1416, the control unit 1440 can rotate the first vibrator 1420 clockwise for 30 seconds and vibrate the second vibrator 1425 for 5 seconds. When the event occurs, the control unit 1440 can drive the first vibrator 1420 and/or the second vibrator 1425 according to one or more of the vibration patterns stored to the storage unit 1415.

Additionally, the control unit 1440 can generate a vibration pattern using data input from a user. For example, besides the vibration patterns stored in the storage unit 1415, the control unit 1440 can generate a new vibration pattern using vibration durations and/or vibration directions input by the user. The control unit 1440 can then store the new vibration pattern in the storage unit 1415.

Figure 15:
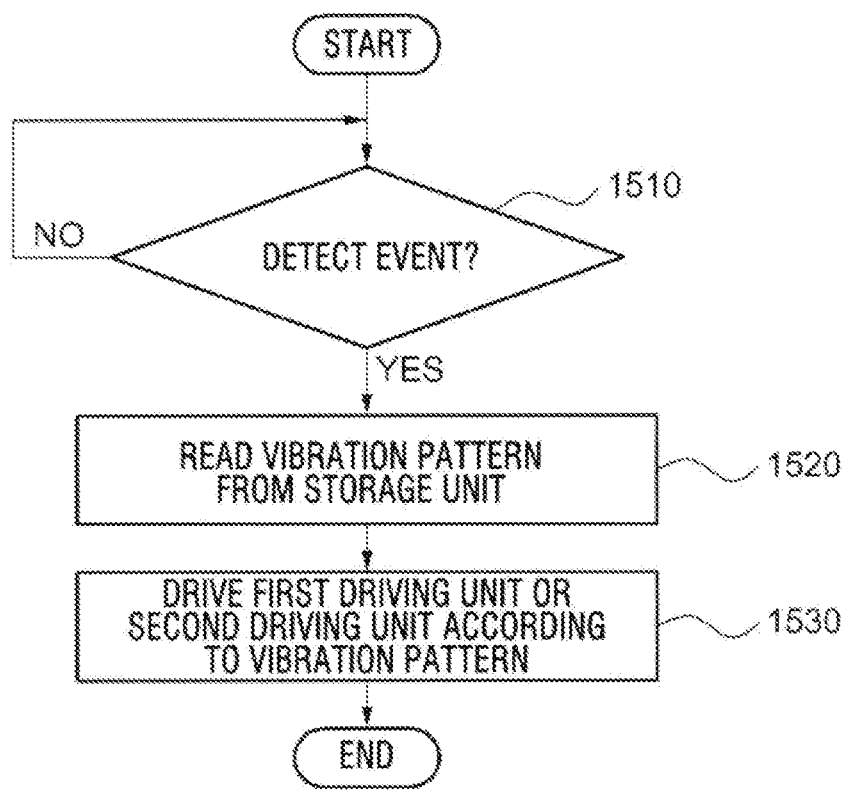
FIG. 15 is a flowchart illustrating a processing method of a vibration control device according to an embodiment of the present invention.

FIG. 15 is a flowchart illustrating a method for processing vibrations of a vibration control device according to an embodiment of the invention.

Referring to FIG. 15, the control unit detects an event in step 1510. For example, the event can be generated by a signal input by a user, a signal input over a communication network, a signal input from a sensor, or a signal according to an internal timer. The control unit receives the input signal and process the corresponding event.

In step 1520, to process the event, the control unit reads a vibration pattern corresponding to the event from the storage unit. The control unit can read at least one vibration pattern from the storage unit containing the plurality of the vibration patterns. For example, the first vibration pattern corresponding to the first event, the second vibration pattern corresponding to the second event, and the third vibration pattern corresponding to the third event can be stored to the storage unit.

The vibration pattern includes data for driving a first driving unit and a second driving unit. That is, the vibration pattern is the data for determining a vibration point, a vibration direction, and a vibration time of the first driving unit and the second driving unit. For example, the vibration pattern includes data for rotating the first driving unit clockwise for 30 seconds and vibrating the second driving unit for 5 seconds.

In step 1530, the control unit controls the first driving unit and/or the second driving unit according to the vibration pattern. Using the first and second driving units to move a vibration control device has already been described in detail above. Accordingly, repetitive description will be omitted here.

In accordance with an embodiment of the present invention, each of the methods described above can be recorded to a computer-readable medium and executed with program commands through various computer devices. The computer-readable medium may store program commands, data files, and data structures alone or in combination. The program commands recorded to the medium can be specially designed or constructed for certain embodiments of the present disclosure, or well-known to those skilled in computer software. Examples of the computer-readable recording medium include magnetic media such as a hard disk, a floppy disk, and magnetic tape, optical media such as a CD-ROM and a DVD, magneto-optical media such as a floptical disk, and hardware devices including and executing program commands, such as a ROM, a RAM, and a flash memory. Examples of the program commands include not only machine language codes created by a compiler but also high-level language codes executable by the computer using an interpreter. To fulfill the present operations, the hardware device can include one or more software modules, and vice versa.

While certain embodiments of the present invention have been described above, various changes or modifications in form and details may be made therein without departing from the spirit and scope of the present invention as defined by the appended claims and their equivalents.

What is claimed is:

1. A vibration control device comprising:
   a first driving unit for vibrating the vibration control device up and down;

a second driving unit for moving the vibration control device left or right; and a control unit for controlling the first driving unit and the second driving unit, upon an occurrence of an event, wherein the control unit controls the second driving unit to move the vibration control device at a time when the first driving unit vibrates the vibration control device off of a surface and when a frictional force of the vibration control device is at a minimum.

2. The vibration control device of claim 1, wherein the first driving unit moves the vibration control device in a same plane as the second driving unit, in a first direction perpendicular to the left and the right, or in a second direction opposite to the first direction.

3. The vibration control device of claim 2, wherein a control signal determines a driving direction of at least one of the first driving unit and the second driving unit.

4. The vibration control device of claim 1, wherein the first driving unit generates a force that moves the vibration control device according to torque.

5. The vibration control device of claim 4, wherein the first driving unit comprises a rotation axis, and the first driving unit and the second driving unit are positioned such that the rotation axis lies in parallel with a vibration direction of the second driving unit.

6. The vibration control device of claim 1, wherein the second driving unit comprises a linear vibrator.

7. The vibration control device of claim 1, wherein the control unit controls at least one of the first driving unit and the second driving unit using an accelerometer.

8. The vibration control device of claim 7, wherein the control unit uses the accelerometer to determine that the first driving unit vibrates the vibration control device off of the surface.

9. The vibration control device of claim 1, wherein the event comprises at least one of:
    a signal generated in the vibration control device;
    a signal received from outside of the vibration control device; and
    a signal generated by a user input.

10. The vibration control device of claim 9, wherein the control unit outputs a control signal corresponding to the event to at least one of the first driving unit and the second driving unit using a parameter input from a user or a predetermined value.

* * * * *